(12) United States Patent
Rozmarynowski et al.

(10) Patent No.: US 9,527,154 B2
(45) Date of Patent: Dec. 27, 2016

(54) INTEGRATED CABLE MANAGEMENT FOR WELDING AND CUTTING SYSTEMS

(71) Applicant: Hobart Brothers Company, Troy, OH (US)

(72) Inventors: Scott Ryan Rozmarynowski, Greenville, WI (US); Brian Scott Bashore, Tipp City, OH (US)

(73) Assignee: HOBART BROTHERS COMPANY, Troy, OH (US)

( * ) Notice: Subject to any disclaimer, the term of this patent is extended or adjusted under 35 U.S.C. 154(b) by 456 days.

(21) Appl. No.: 13/943,298

(22) Filed: Jul. 16, 2013

(65) Prior Publication Data

US 2015/0021305 A1    Jan. 22, 2015

(51) Int. Cl.
| | |
|---|---|
| *B23K 9/32* | (2006.01) |
| *B23K 9/10* | (2006.01) |
| *B23K 9/173* | (2006.01) |
| *B23K 9/29* | (2006.01) |

(52) U.S. Cl.
CPC ............. *B23K 9/1043* (2013.01); *B23K 9/173* (2013.01); *B23K 9/293* (2013.01); *B23K 9/32* (2013.01)

(58) Field of Classification Search
CPC .................................... B23K 9/32; B23K 9/10
USPC ........................... 219/130.1, 136, 133, 137.9
See application file for complete search history.

(56) References Cited

U.S. PATENT DOCUMENTS

| | | | |
|---|---|---|---|
| 2,143,529 A | 1/1939 | Wallace | |
| 4,647,139 A | 3/1987 | Yang | |
| D648,685 S | 11/2011 | Symons | |
| 2005/0258155 A1* | 11/2005 | DeYoung | B23K 9/32 219/130.1 |
| 2007/0039912 A1 | 2/2007 | Hinkens | |
| 2008/0120847 A1* | 5/2008 | Alliss | A01D 34/4165 30/276 |
| 2010/0084387 A1* | 4/2010 | Bender | B23K 9/1006 219/133 |
| 2010/0111481 A1 | 5/2010 | Burek | |
| 2011/0095009 A1 | 4/2011 | Kindig | |
| 2011/0240612 A1* | 10/2011 | Maeno | B23K 26/0884 219/121.63 |
| 2011/0284513 A1 | 11/2011 | Rappl | |

* cited by examiner

*Primary Examiner* — Brian Jennison
(74) *Attorney, Agent, or Firm* — Fletcher Yoder P.C.

(57) ABSTRACT

A system includes a power supply, a first cable assembly, and a second cable assembly. The power supply includes a housing and supports extending from an upper portion of the housing. The first cable assembly has a clamp disposed at a distal end of a first cable extending from the power supply. The clamp is configured to be removably coupled with a workpiece. The second cable assembly has a torch disposed at a distal end of a second cable extending from the power supply. The housing includes one or more sloped panels configured to hold the first and second cables in a position wrapped about the upper portion of the housing when the clamp and the torch are coupled to the supports.

21 Claims, 5 Drawing Sheets

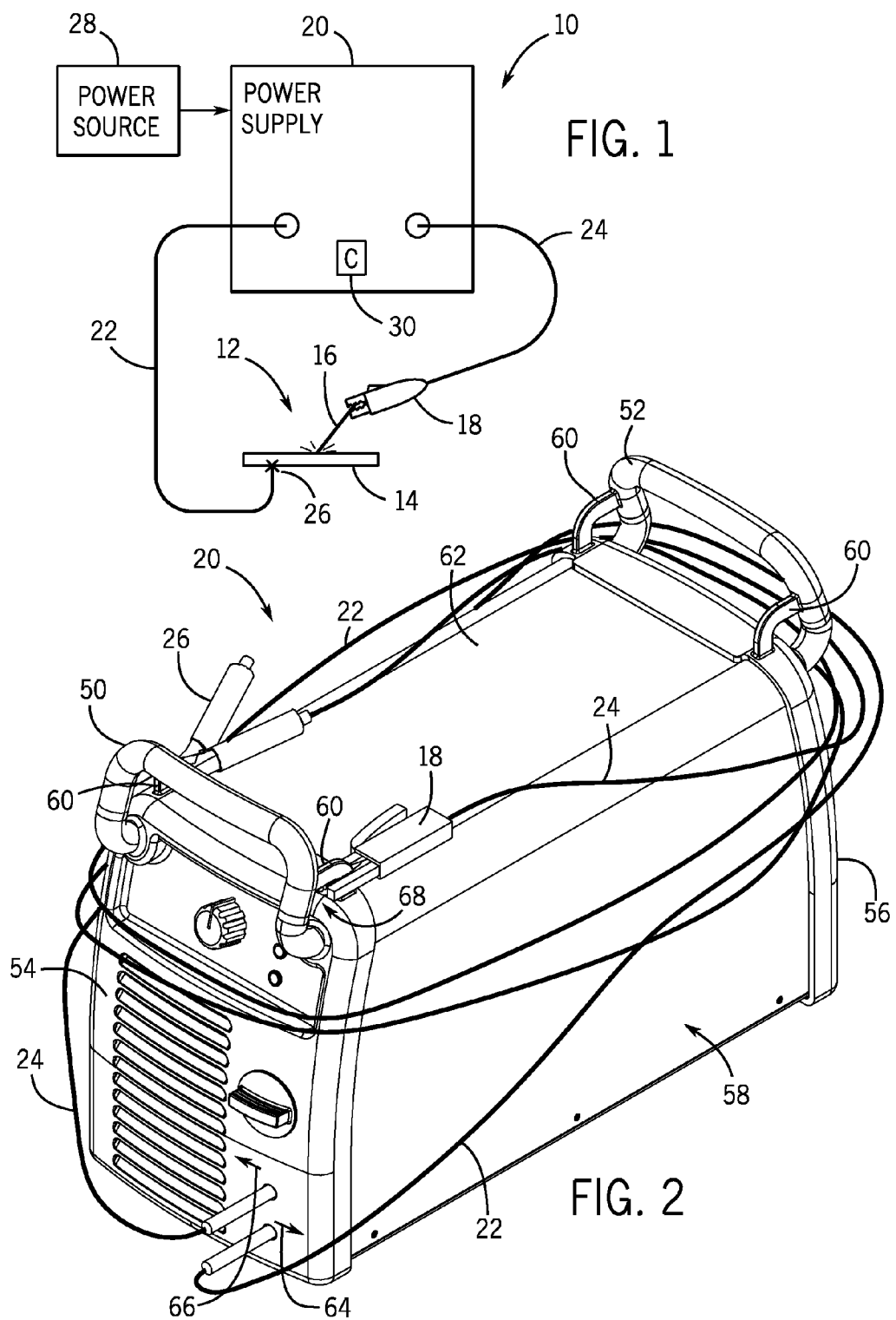

INTEGRATED CABLE MANAGEMENT FOR WELDING AND CUTTING SYSTEMS

BACKGROUND

The invention relates generally to welding and cutting systems and, more particularly, to systems and methods for providing integrated cable management in welding and cutting systems.

Welding and cutting processes have increasingly become utilized in various industries and applications. Welding and cutting processes may include, but are not limited to, processes such as: gas metal arc welding (GMAW), shielded metal arc welding (SMAW), flux cored arc welding (FCAW/FCAW-S), submerged arc welding (SAW), gas tungsten arc welding (GTAW), carbon arc gouging (CAW), plasma arc welding (PAW), and plasma cutting. Such processes may be automated in certain contexts, although a large number of applications continue to exist for manual welding and cutting operations. Such manual operations rely on a variety of types of equipment, including various cables for carrying electrical current between a power supply, a workpiece, and a handheld torch.

In various industries, welding and cutting processes may be performed using machines that are transportable to and from a worksite. Various cable management systems may be utilized with portable welders and plasma cutters to enable relatively easy transportation of the machines and their associated cables. Existing cable management systems have several disadvantages. For example, some welding or cutting machines utilize straps to secure the cables together. However, these secured cables still are not maintained in a relatively stationary position relative to the portable machine as it is carried from place to place. Other portable welders and cutters include sheet metal brackets or hangers located along a front panel of the machine so that the cables may be wrapped around these. However, the cables may slip off of the hanger if they are not wound tightly and, in some instances, there may be no way to secure the clamp or torch located at the end of the cables. Still other portable welding and cutting machines include pouches, such as an accessory bag that hangs over a side of the machine or a machine cover with pockets. These pouches are separate from the physical machine itself and may require an undesirable amount of time and energy to attach to, or position over, the machine. In addition, such pouches may not be fully secured to the machine, so that the pouch jostles during transportation of the machine. Accordingly, it is now recognized that there exists a need for improved cable management systems that are integrated with the welding or cutting machine.

BRIEF DESCRIPTION

Present embodiments are designed to respond to such a need. In accordance with a first embodiment, a system includes a power supply, a first cable assembly, and a second cable assembly. The power supply includes a housing and supports extending from an upper portion of the housing. The first cable assembly has a clamp disposed at a distal end of a first cable. The clamp is configured to be removably coupled with a workpiece. The second cable assembly has a torch disposed at a distal end of a second cable. The housing includes one or more sloped panels configured to hold the first and second cables in a position wrapped about the upper portion of the housing when the clamp and the torch are coupled to the supports.

In another embodiment, a power supply for use in a welding or cutting system includes a housing configured to hold circuitry of the power supply. The housing is shaped such that a lower portion of the housing is wider than an upper portion of the housing. The power supply also includes a handle extending from the upper portion of the housing. In addition, the power supply includes a support structure coupled to the handle and configured to receive a clamp or a torch. The clamp is coupled to a distal end of a first cable, and the torch is coupled to a distal end of a second cable.

In a further embodiment, method for managing cables in a welding or cutting system is provided. The method includes maintaining, via a shaped housing of a power supply, a first cable and a second cable wrapped about the power supply. The method also includes securing, via supports disposed on the power supply, a clamp and a torch to the power supply. The clamp is disposed at a distal end of the first cable and the torch is disposed at a distal end of the second cable.

DRAWINGS

These and other features, aspects, and advantages of the present invention will become better understood when the following detailed description is read with reference to the accompanying drawings in which like characters represent like parts throughout the drawings, wherein:

FIG. 1 is a diagrammatical representation of an embodiment of a welding system that may utilize a cable management system;

FIG. 2 is a perspective view of an embodiment of the welding system of FIG. 1 having cable management features;

DETAILED DESCRIPTION

Figure 3:
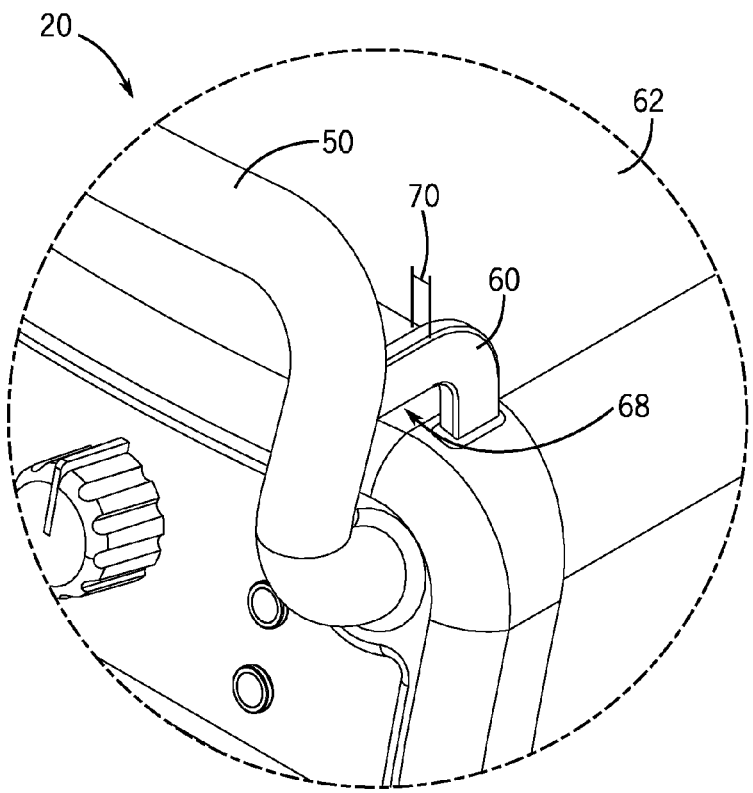
FIG. 3 is a perspective view of an embodiment of a support structure used for cable management in the welding system of FIG. 2.

Presently disclosed embodiments are directed to systems and methods for managing cable assemblies in welding and cutting systems. The cable assemblies may include a work cable assembly and a torch cable assembly, each extending from the same power supply. The work cable assembly includes a work cable, coupled to and extending from the power supply, and a work clamp disposed at a distal end of the work cable. Similarly, the torch cable assembly includes a torch cable, coupled to and extending from the power supply, and a welding torch or a plasma cutting torch disposed at a distal end of the torch cable. The cable management systems described herein allow an operator to wrap the different cables around the power supply and to hold them in place while moving the power supply from place to place. The operator can wrap the cables around the power supply with relative ease and attach the work clamp and the torch to the power supply via supports integrated with the power supply. Such supports may include structures built into an upper portion of the power supply, and the supports may be designed to receive the clamp and/or the torch. In addition to such supports, the power supply may be equipped with a specially shaped housing that slopes inward from the bottom to the top of the power supply, in order to maintain the cables in the wrapped position about the upper portion of the power supply. This cable management system, integral with the power supply, may offer relatively easy management of the work cable and the torch cable, so that an operator does not have to balance the cables on top of the power supply while carrying it around. The supports and other features of the power supply are integral with the machine. Since the power supply may be initially constructed to include such features, the enhanced cable management may be relatively inexpensive to implement.

Turning now to the drawings, FIG. 1 is a diagrammatical representation of an embodiment of a welding/cutting system 10 that may utilize the disclosed cable management system. In the illustrated embodiment, the system 10 includes a shielded metal arc welding (SMAW) system used to produce an electric arc 12 for heating a workpiece 14 via a consumable welding electrode 16. The electrode 16, also referred to as a "stick electrode", may include a metal core wire with a flux coating of various materials. Power is supplied to the metal core wire to produce the arc 12, which heats the workpiece 14 and melts the wire into a weld puddle formed on the workpiece 14. The flux coating may provide an atmospheric shield of the weld area, reduce weld contaminants, direct and stabilize the arc 12, produce a weld bead with a desired chemical composition, and so forth. An operator may manipulate the electrode 16 in relation to the workpiece 14 via a torch 18, or more specifically, an electrode holder. A power supply 20 (e.g., a "welding machine") provides electricity through a work cable 22 and a torch cable 24 to produce the arc 12. For example, in some welding operations, the power supply 20 provides an electrical current through the work cable 22 to a clamp 26, which is removably coupled to the workpiece 14. The current arcs from the workpiece 14 to the electrode 16, and returns to the power supply 20 through the torch 18 and the torch cable 24. In some welding processes, the current may flow in the opposite direction.

A welding process (AC or DC) may be used to produce the desired weld, and the power supply 20 converts input power from a power source 28 to the desired power output. The power source 28 may be a power grid, although other sources of power may also be used, such as power generated by an engine-driven generator, batteries, fuel cells, or other alternative sources. The power supply 20 includes circuitry 30, which may include power conversion circuitry, control circuitry, operator interface circuitry, and so forth. This circuitry 30 is configured to produce power that is suitable for welding.

In present embodiments, the power supply 20 may include an integrated cable management system. That is, certain built-in features of the power supply 20 may be used to secure the work cable 22, the torch cable 24, the torch 18, and the clamp 26 directly to the power supply 20, allowing for relatively easy transportation of the system 10 when it is not in use. Such cable management features may be applied to portable plasma cutting systems as well. For example, in some embodiments, the power supply 20 may be a plasma torch power supply coupled to the torch 18, which may be a plasma torch. In such embodiments, the power source 28 may provide a current to the torch 18 for starting and generating a pilot arc, and for maintaining plasma and a cutting arc. For example, the power supply 20 may be configured to supply a suitable voltage and current to create an electrical circuit from the power supply 20, along the torch cable 24 to the torch 18, across a gap between the torch 18 and the workpiece 14 (e.g., as an electrical arc), through the workpiece 14 to the clamp 26, through the work cable 22 back to the power supply 20.

Other types of welding and cutting systems may make use of the presently disclosed cable management system. For example, the system 10 may include any desirable system (e.g., GMAW, GTAW, FCAW, SAW, CAW, etc.) that generates and maintains a current flowing between the power supply 20 and the workpiece 14 via the cables 22 and 24, the torch 18, and the clamp 26. The cable management features included in the power supply 20 may facilitate securing of the torch 18 and the clamp 26 to the power supply 20, as well as maintaining the cables 22 and 24 wrapped about the power supply 20.

FIG. 2 is a perspective view of an embodiment of the power supply 20 having certain cable management features. In the illustrated embodiment, the power supply 20 includes a set of two handles 50 and 52. The handles 50 and 52 may be molded into a front panel 54 of the power supply 20 and a back panel 56 of the power supply 20, respectively. In the illustrated embodiment, the handles 50 and 52 extend upward from the front panel 54 and the back panel 56, respectively. However, different handle arrangements may be employed in other embodiments. The front panel 54 and the back panel 56 form part of a housing 58 of the power supply 20. The housing 58 may enclose the circuitry 30 of the power supply 20, and the cables 22 and 24 may extend from the front panel 54 of the housing 58, as shown.

The power supply 20 may also include built-in supports 60. The torch 18 and the clamp 26 may be attached to the power supply 20 via the supports 60. That is, the supports 60 are configured to receive the torch 18 and the clamp 26, thereby facilitating effective management of the torch cable 24 and the work cable 22. The supports 60 may extend from an upper portion of the power supply 20, such as an upper panel 62 of the housing 58. In some embodiments, the supports 60 may be coupled to one or both of the handles 50 and 52. In the illustrated embodiment, for example, the supports 60 are coupled between each of the handles 50 and 52 and the upper panel 62 of the housing 58. Although four supports 60 are shown FIG. 2, two disposed along each of the handles 50 and 52, other embodiments of the power supply 20 may include different numbers of supports 60. For example, some embodiments may include only two supports 60 disposed along the same handle (e.g., handle 50 or handle 52). In still other embodiments, a single support 60 may be positioned along the upper panel 62 and/or coupled to one of the handles 50 and 52, the support 60 being designed to receive both the torch 18 and the clamp 26. For example, the clamp 26 and the torch 18 may both be clamped to the single support 60, or the clamp 26 may be clamped to the support 60 while the torch 18 is disposed in an opening within the support 60. The single support 60 may be disposed at a corner of the power supply 20, or at a central location (e.g., between corners) along the top of the front panel 54 or the back panel 56.

The supports 60 may be configured to receive different types of torches 18 and/or clamps 26. For example, the supports 60 may be able to receive a welding torch, an electrode holder, a ground clamp, a plasma torch, or any other equipment that is coupled to a distal end of the work cable 22 or the torch cable 24. In the illustrated embodiment, the supports 60 include L-shaped brackets that are integrated with the rest of the body of the power supply 20. Other embodiments may utilize different types of built-in structures to support the torch 18 and the clamp 26.

In order to prepare the power supply 20 for transportation, an operator may wrap the work cable 22 and the torch cable 24 around the housing 58, and secure the torch 18 and the clamp 26 to the power supply 20 via the supports 60. In addition to the supports 60, the power supply 20 may be equipped with other features to maintain the cables 22 and 24 in position for easy transportation of the power supply 20. For example, the front panel 54 of the power supply 20 may be generally curved, angled, or otherwise sloped toward the base of the handle 50. The slope is such that the base of the power supply 20 is wider than the upper portion of the power supply 20. This may help to support the work cable 22 and the torch cable 24 as they are wrapped around the housing 58 of the power supply 20 and connected to the upper portion of the power supply 20 via the supports 60. The sloped front panel 54 may keep the cables 22 and 24 from sliding down the sides of the housing 58, coming unwrapped, or falling beneath the power supply 20 before it is set down. Although this discussion relates to a sloped front panel 54, any one or more of the vertically aligned panels (e.g., front, back, or side panels) that make up the housing 58 may be sloped to hold the cables 22 and 24 in position. For example, in the illustrated embodiment, each of the front and back panels 54 and 56 are sloped. In other embodiments, however, one or both of the side panels of the housing 58 may be sloped to hold the cables 22 and 24.

In the illustrated embodiment, the handles 50 and 52 may help to maintain the cables 22 and 24 in the wrapped position as well. More specifically, the handles 50 and 52 may protrude longitudinally outward from the upper portion of the power supply 20 to form an upper bound above which the cables 22 and 24 cannot slide. In this way, the power supply 20 may maintain the cables 22 and 24 in the wrapped position around the upper portion of the power supply 20. The cables 22 and 24 may be bounded above by the handles 50 and 52 and below by the sloped base of the housing 58.

The power supply 20 and/or the cables 22 and 24 may be appropriately sized for maintaining the cables 22 and 24 in a wrapped position, while keeping the torch 18 and the clamp 26 secured to stationary portions (e.g., supports 60) of the power supply 20. To accomplish this, the power supply 20 may be sized such that the corresponding cables 22 and 24 are configured to be wrapped around the power supply 20 a specific number of times. For example, the cables 22 and 24 may be wrapped around the power supply 20 one, two, three, four, five, or more times before they are secured in place against the supports 60. In some embodiments, the cables 22 and 24 may each be different lengths and designed to be wrapped around the power supply 20 a different number of times.

In the illustrated embodiment, the power supply 20 is designed so that the work cable 22 is to be wrapped around the housing 58 in a first direction and the torch cable 24 is to be wrapped around the housing 58 in a second direction (opposite the first direction). To indicate this direction for each of the cables 22 and 24, the power supply 20 may include visual indicators 64 and 66, shown as arrows, displayed on the front panel 54 adjacent to where the respective cables 22 and 24 exit the housing 58. Such indicators 64 and 66 may include markings, indentations, LEDs, decals, and the like. The cables 22 and 24 may be wrapped around the power supply 20 with just enough length left over for attaching the torch 18 and the clamp 26 to the supports 60. In some embodiments, multiple supports 60 may be available along the upper portion of the power supply 20 so that, if the cables 22 and 24 are wrapped in the wrong direction or are not wrapped tightly enough, the torch 18 and the clamp 26 may still be received via the supports 60. In other embodiments, there may only be one or two supports 60 such that the cables 22 and 24 have to be wrapped in the correct direction to be secured in place about the upper portion of the power supply 20.

FIG. 3 is a more detailed perspective view of a portion of the power supply 20, including a support 60 used to receive the torch 18 or the clamp 26. In the illustrated embodiment, the support 60 includes an L-shaped bracket that is attached to both the handle 50 and the upper panel 62 of the power supply 20. In other embodiments, the L-shaped bracket may be coupled between the handle 50 and the upper panel 62. The support 60 may be disposed between the handle 50 and the upper portion of the power supply 20 to provide additional rigidity for supporting the handle 50 relative to the housing 58. The shape of the support 60 defines an open space 68 between the support 60 and the handle 50. The torch 18 or the clamp 26 may be received into this open space. In some embodiments, the torch 18 or clamp 26 may be secured in direct contact with the support 60. The support 60 may be sized appropriately for whatever type of attachment is used to secure the torch 18 or clamp 26 to the support 60. For example, the support 60 may have a desired thickness 70 for the clamp 26 or torch 18 to be secured thereon. As noted above, other structural arrangements and placements of the support 60 may be used for securing the torch 18 or the clamp 26 to the power supply 20.

Figure 4:
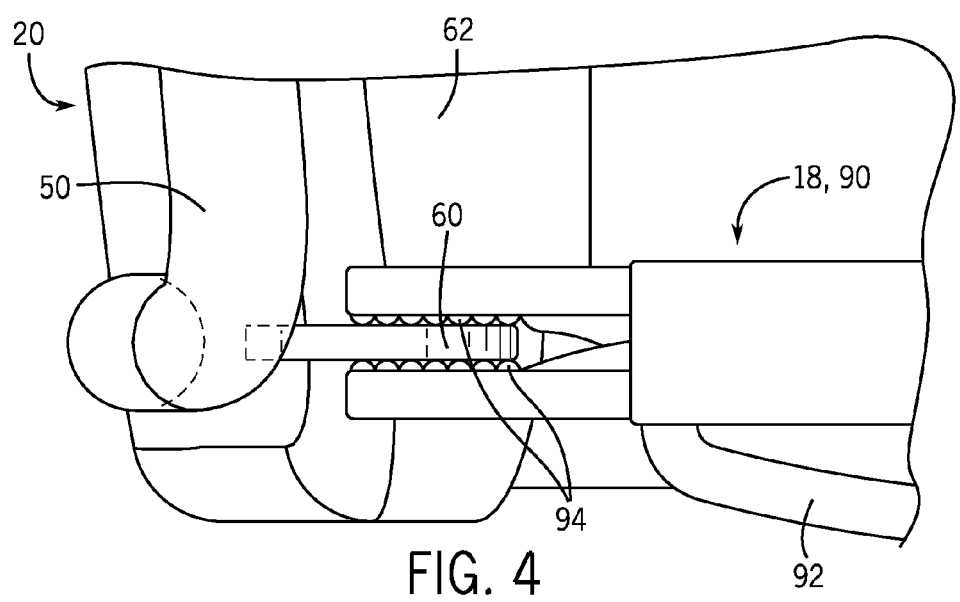
FIG. 4 is a top view of an embodiment of an electrode holder secured to the support structure of FIG. 3.
Figure 5:
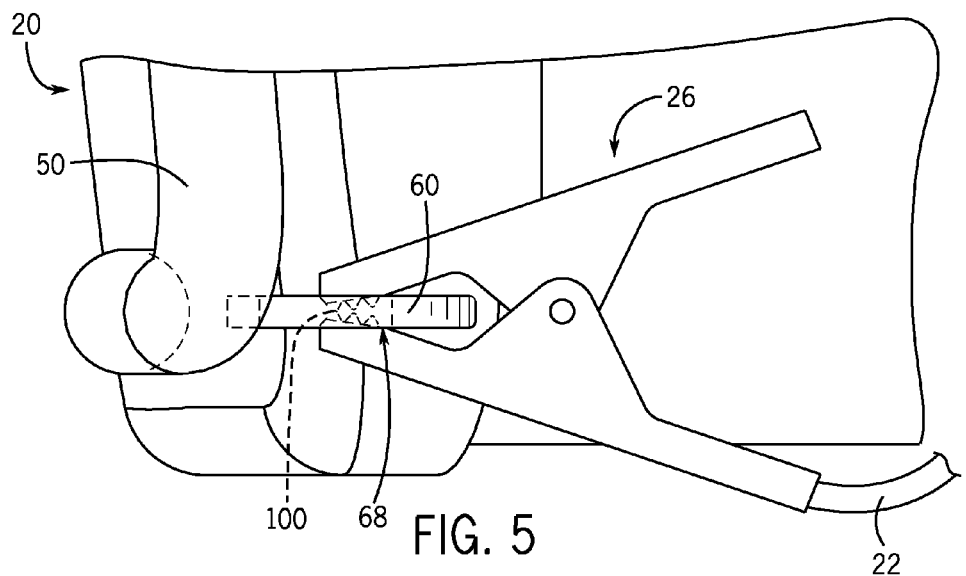
FIG. 5 is a top view of an embodiment of a clamp secured to the support structure of FIG. 3.
Figure 6:
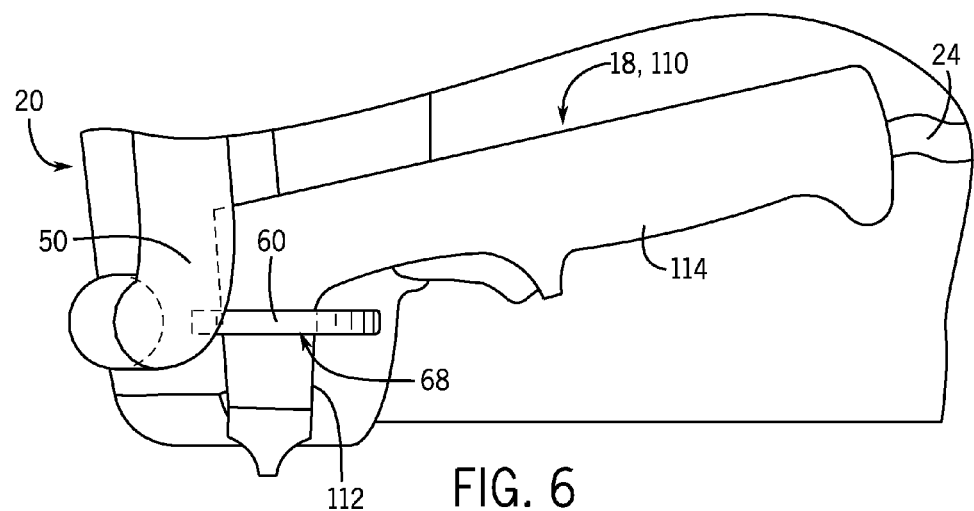
FIG. 6 is a top view of an embodiment of a plasma torch secured to the support structure of FIG. 3.

FIGS. 4-6 provide examples of different types of torches 18 and clamps 26 that may be secured to the power supply 20 in different ways using the same support 60. FIG. 4 is a top view of an embodiment of an electrode holder 90 clamped over the support 60. The electrode holder 90 represents one type of torch 18 (i.e., welding torch) that may be used to form an arc on a workpiece. As noted above with reference to FIG. 1, the electrode holder 90 may hold the electrode 16, while the power supply 20 provides power for generating the arc 12 between the electrode 16 and the workpiece 14. When not in use, the electrode holder 90 may be clamped over the support 60, as shown. The portion of the support 60 that is clamped by the electrode holder 90 may be approximately the same thickness as an electrode 16.

To insert the electrode holder 90 onto the support 60, an operator may squeeze a lever 92 of the electrode holder 90. This lever 92, when pressed, opens the electrode holder 90, separating teeth 94 of the electrode holder 90. Once opened, the electrode holder 90 may be inserted over the support 60 of the power supply 20, and the lever 92 released so that the teeth 94 grasp the outer edges of the support 60. In this way, the electrode holder 90, which may be used in an SMAW system, is coupled to the support 60 built into the power supply 20.

In some embodiments, the clamp 26 may be secured to the support 60 in the same way as the illustrated electrode holder 90. That is, the clamp 26 may be closed directly into contact with the support 60 via teeth. However, in other embodiments, the clamp 26 may be closed against itself, over the support 60. One such embodiment is shown in FIG. 5, which is a top view of the clamp 26 closed against itself within the space 68 formed between the support 60 and the handle 50.

Teeth 100 of the clamp 26 are shown in direct contact with each other, instead of in direct contact with the outside of the support 60. The clamp 26 may hang relatively loosely from the support 60 when connected in this manner. However, this type of connection may be desirable since the clamp 26 cannot slide off or be pulled out of its secured position around the support 60. Indeed, in order to remove the clamp 26 from the support 60 as shown, an operator must squeeze the clamp 26 open and remove the opened clamp 26 from the support 60.

The space 68 may be used in other ways to receive the torch 18 or the clamp 26 within the support 60. For example, FIG. 6 shows an embodiment of the torch 18 being held within the space 68 between the support 60 and the handle 50. In the illustrated embodiment, the torch 18 includes a plasma torch 110 for use in a plasma welding system, as described above. The plasma torch 110 may be configured to hook into the support 60. That is, the plasma torch 110 may include a nozzle 112 that protrudes at an angle from a handle 114 of the plasma torch 110. The nozzle 112 may be received through the space 68, thereby securing the plasma torch 110 in position relative to the support 60. The plasma torch 110 is configured to be partially held in place within the space 68 (e.g., opening) defined by the support 60. More specifically, the plasma torch 110 may be secured to the power supply 20 via a friction fit maintained between the plasma torch 110 within the opening through the support 60. In other embodiments, the plasma torch 110 may be coupled to the support 60 via a hook or clip disposed on the plasma torch 110, since the plasma torch 110 may not be designed to exert a clamping force. Similar techniques may be used to secure other torches 16 that do not exert a clamping force, such as a MIG torch or a TIG torch to the power supply 20 via the support 60.

In some embodiments, the support 60 may be specially formed to receive the plasma torch 110 that corresponds with the particular power supply 20. In such embodiments, one or more additional supports 60 may be shaped to receive the clamp 26 and not the plasma torch 110. In still other embodiments, each of the supports 60 may be configured to receive any of the different types of torches 18 (e.g., electrode holder 90, MIG welding torch, TIG welding torch, plasma torch 110, etc.) or clamps 26 associated with the particular power supply 20. That way, either of the supports 60 located on the upper portion of the power supply 20 may be used for whichever torch 18 or clamp 26 is closest to the support 60 after the cables 22 and 24 are wrapped.

In some embodiments, the supports 60 may be inserted onto and removed from the power supply 20 as desired. In such embodiments, different types of supports 60 may be switched out or installed onto different parts of the power supply 20. This may allow for selective retrofitting of the power supply 20 based on the type of torch 18 in use, the length of the cables 22 and 24, and other operator needs.

Figure 7:
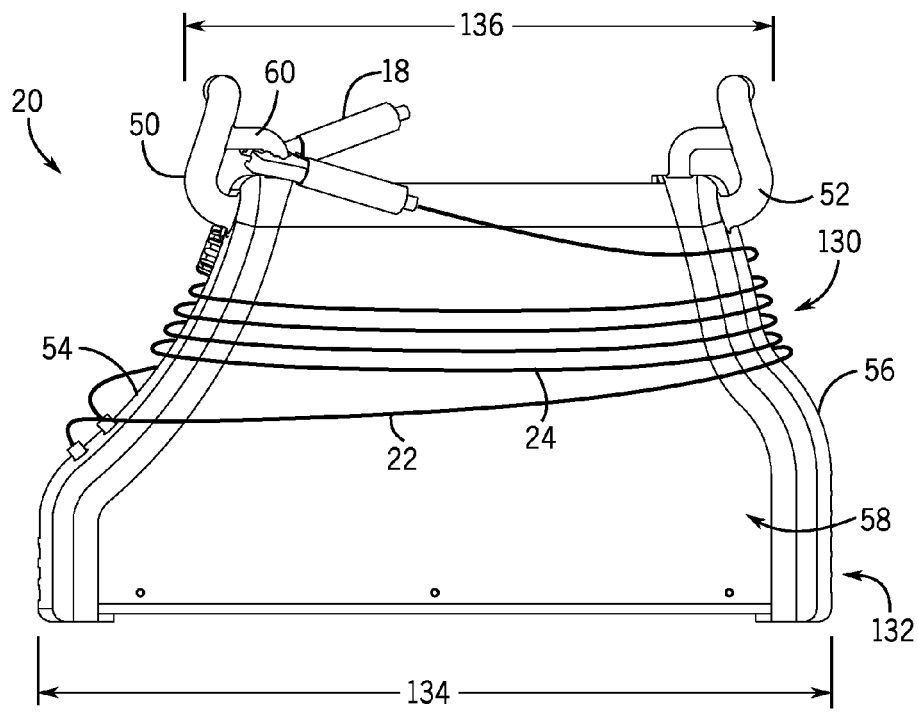
FIG. 7 is a diagrammatical representation of an embodiment of a power supply housing used for cable management in the welding system of FIG. 2.

FIG. 7 is a diagrammatical representation of an embodiment of the power supply 20, illustrating an exemplary shape of the housing 58. In the illustrated embodiment, the shape of the housing 58 is exaggerated to facilitate description of the features afforded by the general shape. As discussed above, one or more of the panels (e.g., front panel 54, back panel 56) of the housing 58 may be shaped to maintain the cables 22 and 24 in a wrapped position about an upper portion 130 of the power supply 20. Specifically, the panels 54 and 56 may slope upward, so that a lower portion 132 of the power supply 20 is wider than the upper portion 130. In the illustrated embodiment, for example, the lower portion 132 is a first distance 134 across (measured from the front panel 54 to the back panel 56). Likewise, the upper portion 130 is a second distance 136 across from the front panel 54 to the back panel 56. This second distance 136 is smaller than the first distance 134. Thus, the length of the power supply 20 changes from the lower portion 132 (where the cables 22 and 24 exit the power supply 20) to the upper portion 130 (where the torch 18 and the clamp 26 are coupled with the supports 60). This change in length helps maintain the wrapped cables 22 and 24 in position around the upper portion 130 once the torch 18 and the clamp 26 are secured to the power supply 20. The power supply 20 may be shaped such that the lower portion 132 has a larger area than the upper portion 130.

Figure 8:
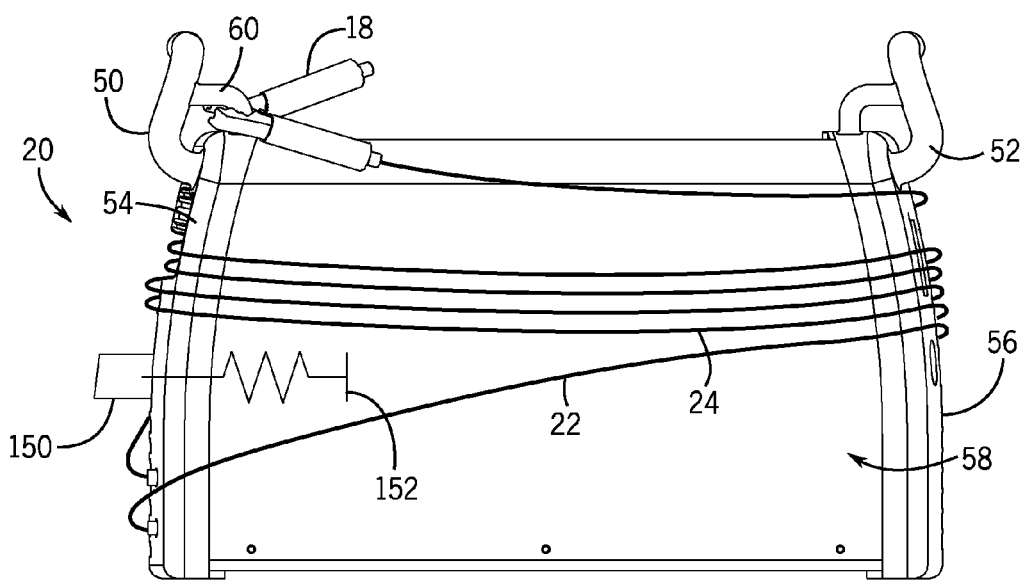
FIG. 8 is a diagrammatical representation of another embodiment of a power supply housing used for cable management in the welding system of FIG. 2.

In other embodiments, the power supply 20 may include additional features along one or more of the housing panels (e.g., front panel 54) to maintain the cables 22 and 24 in a desired wrapped position. As an example, FIG. 8 is a diagrammatical representation of another embodiment of the power supply 20. In this embodiment, the power supply 20 includes a built-in stopper 150 that extends from the front panel 54 of the power supply 20. This stopper 150 may be any protruding structural feature of the power supply 20 that extends from the housing 58. The stopper 150 functions as a cable support for the cables 22 and 24 that are wrapped around the power supply 20. The stopper 150 may be located just below the upper portion 130 of the power supply 20, so that the cables 22 and 24 may be wrapped around the housing 58 at a point above the stopper 150. As illustrated, the front panel 54 and/or the back panel 56 of the housing 58 may slope inward between the lower portion 132 and the upper portion 130, even though the stopper 150 is present. Indeed, the stopper 150 may function as a failsafe to catch the cables 22 and 24 if they begin to slide down the power supply 20. In some embodiments, the stopper 150 may be less pronounced than the one illustrated in FIG. 8. That is, the stopper 150 may include a smooth protrusion that slopes outward from the front panel 54.

In some embodiments, the stopper 150 may be physically built into the housing 58, so that it is part of the housing 58 that protrudes outward. In other embodiments, however, the stopper 150 may be retractable into the housing 58. As illustrated, the stopper 150 may be spring loaded via a spring mechanism 152 inside the housing 58. This may allow an operator to selectively extend the stopper 150 outward from the housing 58 when wrapping the cables 22 and 24, and to return the stopper 150 into the housing 58 when it is not in use. In such embodiments, the stopper 150 may feature an outward facing shape that corresponds to the shape of the housing 58, so that the stopper 150 is relatively inconspicuous when retracted.

Figure 9:
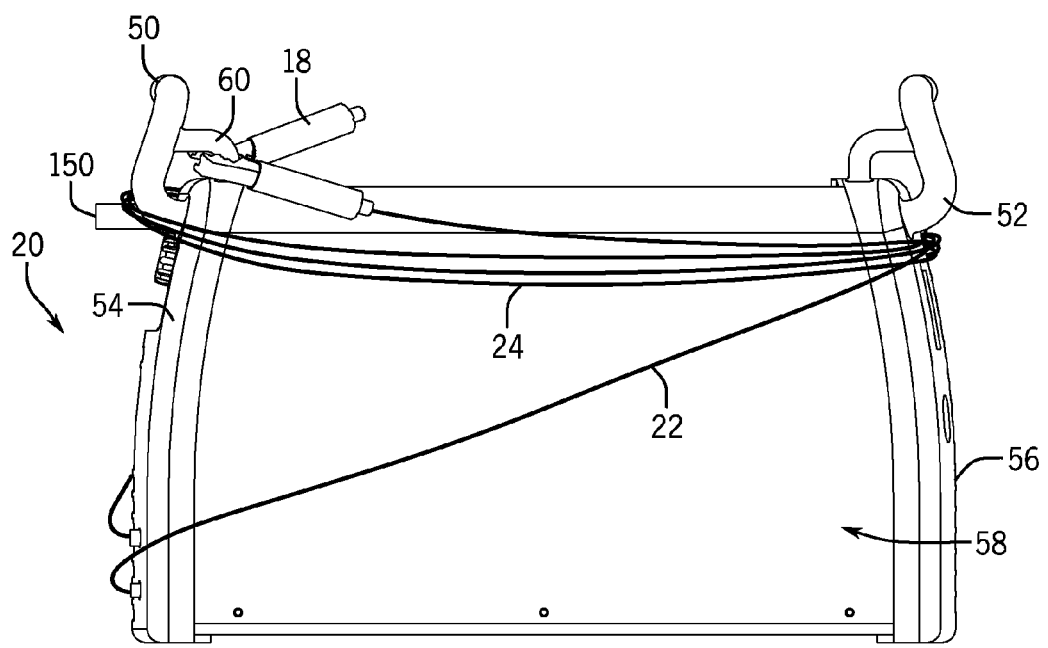
FIG. 9 is a diagrammatical representation of another embodiment of a power supply housing used for cable management in the welding system of FIG. 2.

In other embodiments, the stopper 150 may be located on one or both of the handles 50 and 52. FIG. 9 is a diagrammatical representation of one such embodiment. In the illustrated embodiment, the handle 50 is equipped with the stopper 150, in order to keep the cables 22 and 24 wrapped around the upper portion 130 of the power supply 20. The stopper 150 may maintain the cables 22 and 24 in this wrapped position so that they do not fall from the upper portion 130 of the power supply 20 as the power supply 20 is moved. The stopper 150 may be built into the handle in some embodiments.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a power supply comprising a housing and one or more supports extending from an upper portion of the housing, wherein the one or more supports comprise first and second generally L-shaped brackets coupled between a handle of the power supply and the upper portion of the housing;
a first cable assembly having a clamp disposed at a distal end of a first cable, wherein the clamp is configured to be removably coupled with a workpiece, wherein the clamp is configured to be coupled to the first bracket via a clamping force exerted by the clamp, and wherein the first bracket has a thickness such that the first bracket fits inside the clamp; and
a second cable assembly having a torch disposed at a distal end of a second cable;
wherein the housing comprises one or more sloped panels configured to hold the first and second cables in a position wrapped about the upper portion of the housing when the clamp and the torch are coupled to the supports.

2. The system of claim 1, wherein the one or more sloped panels comprise a front panel of the housing or back panel of the housing.

3. The system of claim 1, wherein the first cable has a first length and the second cable has a second length, wherein the housing and the first and second lengths are sized to facilitate positioning of the clamp and the torch proximate the first and second brackets, and to maintain the first and second cables in a wrapped position when the first and second cables are wrapped about the housing.

4. The system of claim 1, wherein the first cable is configured to be wrapped about the power supply in a first direction, and the second cable is configured to be wrapped about the power supply in a second direction opposite the first direction.

5. The system of claim 4, wherein the power supply comprises markings to indicate the first and second directions in which the first and second cables are to be wrapped about the power supply.

6. The system of claim 1, wherein the torch comprises an electrode holder configured to be coupled to one of the supports via a clamping force exerted by the electrode holder.

7. The system of claim 1, wherein the torch comprises a plasma cutting torch configured to be partially held in place within a space defined by one of the supports.

8. A power supply for use in a welding or cutting system, comprising:
a housing configured to hold circuitry of the power supply, wherein the housing is shaped such that a lower portion of the housing is wider than an upper portion of the housing;
a handle extending from the upper portion of the housing; and
a support structure coupled to the handle and configured to receive a clamp or a torch, wherein the support structure comprises first and second generally L-shaped brackets coupled between the handle and the upper portion of the housing, wherein the clamp is coupled to a distal end of a first cable, and the torch is coupled to a distal end of a second cable, wherein the first bracket is shaped to facilitate clamping of the clamp or the torch around the support structure, wherein the clamp is configured to be coupled to the first bracket via a clamping force exerted by the clamp.

9. The power supply of claim 8, wherein the housing is shaped to maintain at least one of the first cable and the second cable in a wrapped position around the upper portion of the housing when the clamp or the torch is coupled to the support structure.

10. The power supply of claim 9, wherein the housing comprises at least one panel that is sloped from the lower portion of the housing to the upper portion of the housing to maintain the first and second cables in the wrapped position.

11. The power supply of claim 9, comprising a stopper extending from a panel of the housing or from the handle, wherein the stopper is configured to maintain the first and second cables in the wrapped position.

12. The power supply of claim 11, wherein the stopper is retractable into the panel of the housing.

13. The power supply of claim 8, wherein the support structure is sized to facilitate clamping of the clamp or the torch directly onto the support structure.

14. The power supply of claim 8, wherein the support structure is shaped to facilitate clamping of the clamp or the torch around the support structure.

15. The power supply of claim 8, comprising two support structures coupled to one or more handles of the power supply, wherein the support structures are configured to receive one each of the clamp and the torch.

16. The power supply of claim 8, comprising a single support structure coupled to a handle of the power supply, wherein the support structure is configured to receive both the clamp and the torch.

17. The system of claim 1, wherein the second bracket defines a space for receiving the torch.

18. The system of claim 17, wherein an interface between the torch and the second bracket is a friction fit.

19. The power supply of claim 8, wherein the second bracket defines a space for receiving the torch.

20. The power supply of claim 19, wherein an interface between the torch and the second bracket is a friction fit.

21. The power supply of claim 8, wherein the first cable has a first length and the second cable has a second length, wherein the housing and the first and second lengths are sized to facilitate positioning of the clamp and the torch proximate the first and second brackets, and to maintain the first and second cables in a wrapped position when the first and second cables are wrapped about the housing a specific number of times.

* * * * *